(12) United States Patent
Georgalas

(10) Patent No.: US 7,019,740 B2
(45) Date of Patent: Mar. 28, 2006

(54) RESOURCE CREATION METHOD AND TOOL

(75) Inventor: Nektarios Georgalas, Ipswich (GB)

(73) Assignee: British Telecommunications public limited company, London (GB)

( * ) Notice: Subject to any disclaimer, the term of this patent is extended or adjusted under 35 U.S.C. 154(b) by 271 days.

(21) Appl. No.: 10/239,708

(22) PCT Filed: Mar. 23, 2001

(86) PCT No.: PCT/GB01/01281

§ 371 (c)(1),
(2), (4) Date: Sep. 25, 2002

(87) PCT Pub. No.: WO01/75589

PCT Pub. Date: Oct. 11, 2001

(65) Prior Publication Data

US 2003/0112232 A1    Jun. 19, 2003

(30) Foreign Application Priority Data

Mar. 31, 2000  (EP) .................................. 00302757

(51) Int. Cl.
*G06T 15/00* (2006.01)

(52) U.S. Cl. ........................ 345/418; 714/47; 707/100; 718/100

(58) Field of Classification Search ................ 345/418; 714/47, 48; 707/100, 101; 718/100, 104
See application file for complete search history.

(56) References Cited

U.S. PATENT DOCUMENTS

| | | | |
|---|---|---|---|
| 5,784,620 A | 7/1998 | Isham | 719/316 |
| 5,809,297 A | 9/1998 | Kroenke et al. | 707/102 |
| 6,035,342 A | 3/2000 | Bernstein et al. | 719/315 |
| 6,038,393 A | 3/2000 | Iyengar et al. | 717/104 |
| 6,058,426 A * | 5/2000 | Godwin et al. | 709/229 |
| 6,253,225 B1 * | 6/2001 | Nakahara et al. | 718/100 |
| 6,353,898 B1 * | 3/2002 | Wipfel et al. | 714/48 |
| 6,848,102 B1 * | 1/2005 | Nakahara et al. | 718/104 |

FOREIGN PATENT DOCUMENTS

| | | |
|---|---|---|
| EP | 0496380 A2 | 7/1992 |
| EP | 0833259 A2 | 4/1998 |

OTHER PUBLICATIONS

Chawathe et al, The TSIMMIS Project: Integration of Heterogeneous Information Sources, Oct., 1994, IPSJ Conference, Tokyo.

(Continued)

*Primary Examiner*—Phu K. Nguyen
(74) *Attorney, Agent, or Firm*—Nixon & Vanderhye P.C.

(57) ABSTRACT

A method of and tool for resource creation in a distributed computing environment uses a variety of resources which may be located at locations distributed throughout the environment. New resources may be created in this distributed environment. One example of a new resource that may be created is a resource that integrates previously available but heterogeneous resources as to provide new functionality. A method of resource creation is provided using a system including a plurality of sets of one or more resources, each set of resources being associated with a respective representation, the method including receiving the respective representation of each set of resources; transforming the respective representation of each set of resources into a common representation; populating a store with the common representation of each set of resources; permitting the association of component ones of the resources in their common representation to define a new resource; and creating the new resource from the correspondingly associated respective representations of the component resources.

10 Claims, 10 Drawing Sheets

OTHER PUBLICATIONS

Georgalas, Enterprise Data and Knowledge Integration Using Repository Technology, MPhil Thesis, Information Systems Engineering Group, Dept. of Computation, UMIST, Manchester, Jun. 1998.

Georgalas, A Framework that Uses Repositories for Information Systems and Knowledge Integration. ASSET99 Symposium on Application-Specific Systems and Software Engineering Technology, IEEE Computer Society, Dallas, Texas, Mar., 1999.

Gray et al, KRAFT:Knowledge Fusion from Distributed Databases and Knowledge Bases. Database and Expert System Applications Conference DEXA '97, Toulouse, France, (1997).

McBrien et al, A Uniform Approach to Inter-Model Transformations, Conference of Advance Information System Engineering CAiSE '99, Springer-Verlag LNCS 1626, Heidelberg, Germany, Jun. 1999.

McBrien et al, Automatic Migration and Wrapping of Database Applications—a Schema Transformation Approach, Conference on Conceptual Modelling ER '99, Springer-Verlag LNCS 1728, Paris, France, 1998.

McBrien et al, 1988, A Formalisation of Semantic Schema Integration. Information Systems Journal, 23 (5), 1998.

Poulovassilis et al, 1998, General Framework for Schema Transformation, Data and Knowledge Engineering, 28(1), 1998.

Sheth & Larson, Federated Database Systems for Managing Distributed, Heterogeneous and Autonomous Databases, ACM Computing Surveys, vol. 22, Issue 3, Sep. 1990.

Subrahmanian et al, HERMES: Heterogeneous Reasoning and Mediator System, 1997.

Wiederhold, 1992, Mediators in the Architecture of Future Information Systems, IEEE Computer, 25(3), 1992.

Cheung et al, "An Integrated Method for Effective Behaviour Analysis of Distributed Systems", Proceedings of the 16th International Conference on Software Engineering, IEEE Computer Society Press, Sorrento, Italy, May 1994.

Codd, "A Relational Model of Data for Large Shared Data Banks", Communication of the ACM, vol. 13, No. 6, pp. 377-387, 1970.

"CIM Standards", Distributed Management Task Force (DMTF), 1998.

Flatscher et al, "Metamodeling in EIA/CDIF—Meta-Metamodel and Metamodels", in "Information Modelling in the New Millennium", Rossi and Siau, (eds), Idea Group Publishing, 2000.

Frank et al, "Integration of Behavior Models", Proceedings of the ER97 Workshop on "Behavioural Models and Design Transformations:Issues and Opportunities in Conceptual Modelling", Loa Angeles US, Nov. 1997.

Frederiks et al, "A unifying Framework for Conceptual Data Modelling Concepts", International Journal of Information and Software Technology, Elsevier Science, vol. 39, Issue 1, pp. 15-25, 1997.

Garcia-Molina et al, "The TSIMMIS Approach to Mediation:Data Models and Languages", Journal of Intelligent Information Systems, vol. 8, Issue 2, pp. 117-132, Mar./Apr. 1997.

Georgalas, "The Role of Repositories in Integrating Information Systems and Enterprise Knowledge", Proceedings of the UKAIS99 Conference of the UK Academy for Information Systems in "Information Systems: The Next Generation", McGraw Hill, York, UK, Apr. 1999.

Georgalas, "Policy-Driven Customisation of Personalised Services", Proceedings of Policy Workshop 1999, HP-Laboratories, Bristol, UK, Nov. 1999.

Lausen et al, "Models and Languages of Object-Oriented Databases", Addison Wesley (pubs), England, 1998.

Lobo et al, "A Policy Description Language", Proceedings of AAAI99 Conference, Orlando, Florida US, Jul. 1999.

Maier, "Component Event Diagram a Hierarchical Dynamic Technique to Model Distributed Systems", Dec. 1997.

Marriott, "Policy Service for Distributed Systems", PhD Thesis, Dept of Computing, Imperial College, London, UK, Jun. 1997.

Mylopoulos et al, "Telos:Representing Knowledge About Information Systems", ACM Transactions on Information Systems, vol. 8, No. 4, Oct. 1990.

Cattel et al, "The Object Database Standard:ODMG 2.0", Morgan Kaufmann Publishers, San Francisco, California 1998.

Papazoglou et al,:"On the Representation of Objects with Polymorphic Shape and Behaviour", Proceedings of the ER94 Conference, Stringer-Verlag, Manchester, UK, Dec. 1994.

Rizzo, "Policies for Context-Aware Session Control", Proceedings of Policy Workshop 1999, HP-Laboratories, Bristol, UK, Nov. 1999.

Saeki, "A Meta-Model for Method Integration", International Journal of Information and Software Technology, Elsevier Science, vol. 38, No. 14-15, pp. 925-932, 1998.

Sloman et al, "EPSRC Grant GR/1 96103-SecPol: Specification and analysis of Security Policy for Distributed Systems", Imperial College, Department of Computing, 1996.

Tsalgatidou et al, "Rule-Based Behaviour Modelling: Specification and Verification of Information Systems Dynamics", Journal of Information and Software Technology, vol. 33, No. 6, Aug. 1991.

Vauttier et al, "Extended Specification of Composite Objects in UML", Journal of Object Oriented Programming, May 1999.

World Wide Web Consortium (W3C), "XML-Data", Jan. 1998.

Levy et al, "Querying Heterogenous Information Sources Using Source Descriptions" in Proc. VLDB 1996.

Higa et al, "An Object-Orientated Methodology For End-User Logical Database Design:The Structured Entity Model Approach", Proceedings of the Annual International Computer Software and Applications Conference. (Compsac), US, Washington, IEEE Comp. Soc. Press., vol. Conf. 13, Sep. 20, 1989.

* cited by examiner

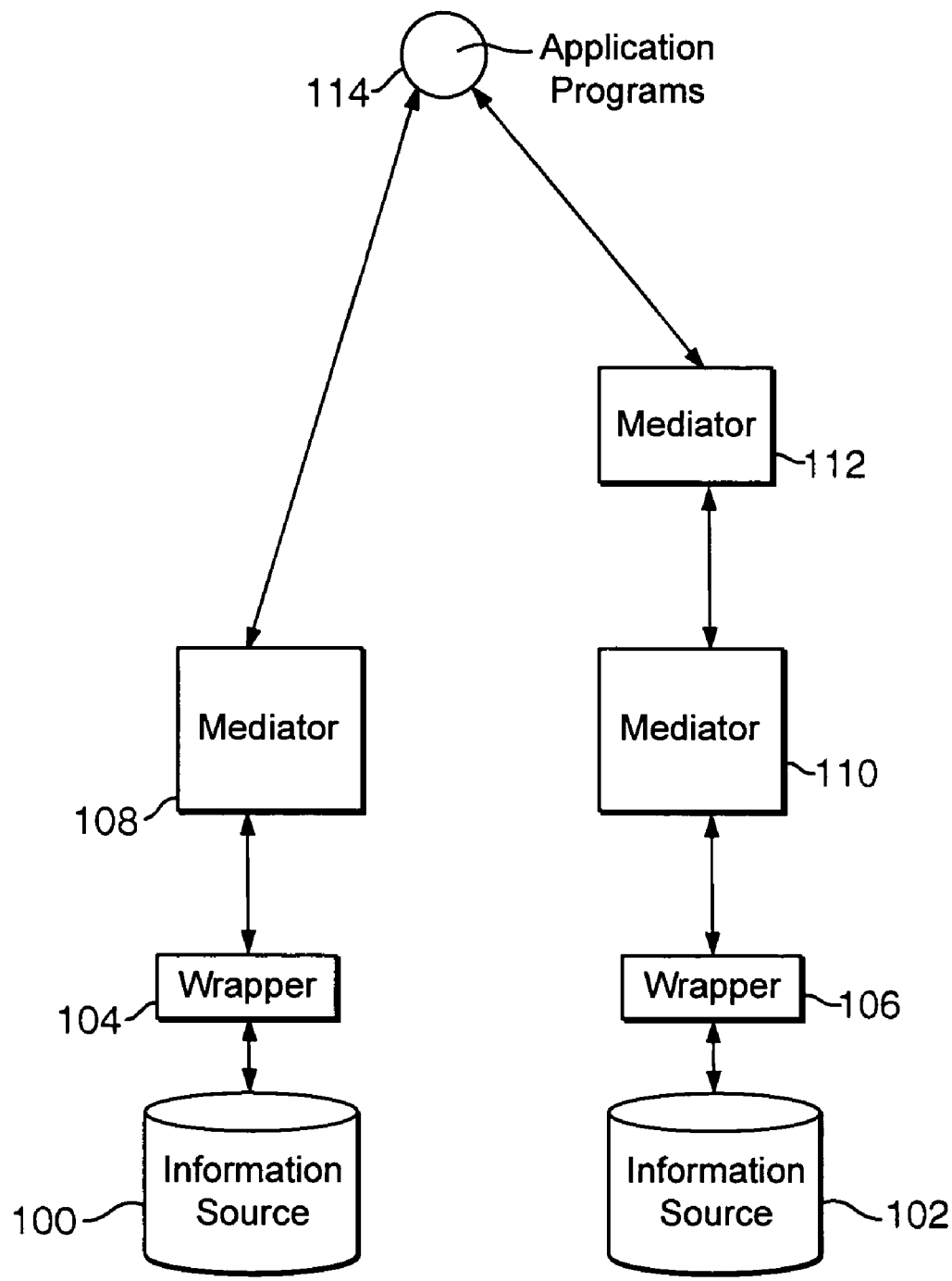

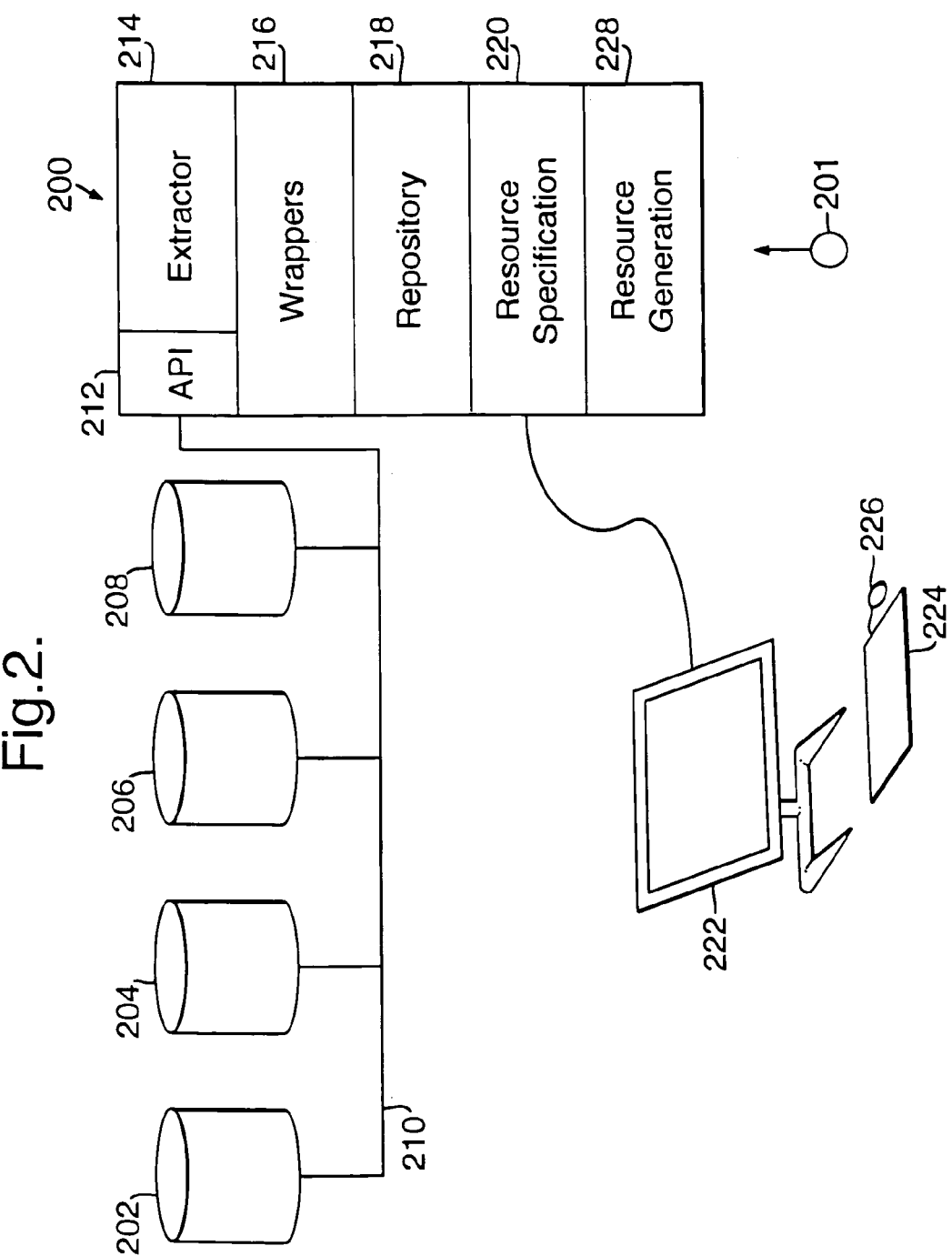

RESOURCE CREATION METHOD AND TOOL

This application is the U.S. national phase of international application PCT/GB01/01281 filed 23 Mar. 2001 which designated the U.S.

BACKGROUND

1. Technical Field

The present invention relates to a method of and tool for resource creation in a distributed computing environment.

2. Related Art

A distributed computing environment may typically take the form of lower layers of infrastructure such as operating systems and networks supporting a layer of so-called middleware above which at the highest layer, distributed application programs can be executed. By way of introduction see, for example, "Understanding Networked Applications", Messerschmitt, Morgan Kaufmann Publishers, 2000. A variety of resources may be located at locations distributed throughout the environment. Typically these resources become visible in the distributed environment by means of middleware provision for making available their existence and capabilities.

Whilst application programs may be aware of the existence and capabilities of such distributed resources, it has often been the case that the heterogeneity of the resources has limited the ability of application programs to capitalise on them.

New resources may be created in this distributed environment. One example of a new resource that may be created is a resource that integrates previously available but heterogenous resources as to provide new functionality. Accordingly, issues associated with the utilisation of heterogenous resources such as information and services have to addressed.

As to the integration of information resources, heterogeneity exists at a number of levels, including for example, the conceptual level and the logical level. Existing information modelling techniques present several shortcomings in terms of their flexibility to model information at both these conceptual and logical levels. Well known examples of such modelling techniques include the relational model, the object-oriented model and a variety of modelling languages such as extensible Markup Language (XML) and other members of the Standard Generalised Markup Language (SGML) family. Each of these examples of well known techniques suffers from the disadvantage that they adopt specific and complex semantics suited to their intended tasks. It is this diversity of modelling semantics that introduces such problems when the need emerges for the integration of different information resources.

As to the integration of services, as indicated, middleware may provide for a degree of integration of distributed service related software components. By way of one example, following the rise of the object-oriented information model, there has been commensurate interest in the possibility of developing distributed objects. Two well known examples of distributed object management systems are the Common Object Request Broker Architecture (CORBA) developed by the Object Management Group (OMG) and the Distributed Component Object Model (DCOM) developed by the Microsoft Corporation.

Such components express their behaviour in interfaces that are defined in an Interface Definition Language (IDL) and are published to client components through Brokers (a client requests an interface from a broker which in turn contacts the interface-provider component). An interface contains the specification of a number of services offered by some component. Hence, an interface can be considered as a package of services or else as a package of behaviour. The implementation of component-based applications is based on the utilisation of such predefined component interfaces. This approach is considered as a static method to integrate behaviour. A dynamic method would enable the construction of dynamic interfaces over runtime which integrate/mix behaviour from a number of components. If such an approach was built utilising the predefined interfaces, it would have created a lot of overhead. This is because every request for a single service would first necessitate request for the whole package of services i.e. the interface the service belongs to. In order to minimise this deficiency/inflexibility there should be reconsideration of the way the components express their behaviour.

One example that has been much addressed of a new resource integrating previously available but heterogenous resources is that of the integration of heterogenous databases. Here, disparate sources of data, created with differing information models and with differing query functionality, are required to be integrated into an apparently single data source, with resultant integrated query functionality. Techniques such as the federation of databases, data warehousing and mediator systems have been deployed.

A so-called Federated-DataBase Management System has been proposed, for which see, for example "Federated Database Systems for Managing Distributed, Heterogenous and Autonomous Databases", Sheth & Larson, ACM Computing Surveys, Vol 22, Issue 3, September 1990. A model is presented with, for example, five sequential transformations the schema of component databases must undergo in order to participate in the federal system. The databases support different data models such as relational, OO, XML. The final External Schema is expressed in a common, semantically rich, modelling language. Such languages are usually Extended Entity Relationship (EER) or OO that are quite rich and, as was examined above, support very specialised semantic constraints. The transformation must be expressed only in terms of these specialised semantics and therefore the result is complex, non-optimal and inflexible translations.

Another example of a rather different approach to the problem is the use of so-called data warehousing. Data warehousing involves the importation of data from a variety of sources to an intermediary database (the warehouse) of particular design. Client applications can then query this intermediate database. Quite apart from the representational difficulties again arising, significant problems occur in ensuring that the intermediary database reflects the current content of the data sources.

A rather more fruitful approach involves the use of so-called mediator systems. The concept of a so-called mediator as a solution to the problem of integrating heterogenous information was proposed in a paper entitled "Mediators in the architecture of future information systems", Wiederhold, IEEE Computer 25:3, pp.38–49.

One example of such a mediator system is provided in a paper entitled "The TSIMMIS Approach to Mediation: Data Models and Languages", Garcia-Molina et al, Journal of International Information Systems 1997.

Having regard to FIG. 1, the TSIMMIS mediator system architecture, as is typical, consists of three layers. A first layer contains heterogenous information sources 100, 102, which might for example each utilise a relational, object oriented or more recently, eXtensible Markup Language (XML) data model. A second layer contains functionality which has effect to transform typically high level queries into a native form which can be used to search the information sources and then transform the native search results back into the high level form. This functionality is provided by so-called wrappers 104, 106, transforming queries and search results into and out of the native form of each information source and the mediators 108, 110, 112 themselves, which act to modify the high level query functionality. A third layer contains the application programs 114 which issue the high level queries.

To these ends, TSIMMIS utilises a component based architecture which provides for:
(i) an information model denoted Object Exchange Model (OEM);
(ii) mediators; specified with a logic-based object-oriented language denoted Mediator Specification Language (MSL) which is designed to operate with the OEM data model and to provide for the necessary functionality in integrating heterogenous information sources;
(iii) wrappers; specified with the Wrapper Specification Language (WSL) and act to transform queries from MSL into the requisite native source form, then transforming the query results into OEM objects as appropriate for return; and
(iv) a query language; MSL is used for the application layer query language, the mediator specification language and the wrapper query language.

A TSIMMIS query consists of rules. Each such rule consists of a head portion, describing objects made available by the mediator, and a body portion, describing conditions that must be satisfied by the source object. An example of such a query is provided in the paper (Example 3):

"Find the books of which Aho is an author."
<booktitle X>:
  <library {<book {<title X><author "Aho">}>}@s1

This query thus pertains to a root object library, available at a source s1, which could either be a wrapper or a mediator. This query could itself function as a trivial mediator, in that it exports book titles of books by Aho that are found at source s1.

A template tool is used to generate wrappers. An example is given of such a template (Example 4):
<books X>:-
  <library {X:<book {<title X><author $AU>}>}@s1
  // sprintf(lookup-query, "find author %s", $AU)// such that the wrapper generated as a result would take the query:
<books B>:-
  <library {<book {<title X><author "Aho">}>}@s1 and generate a native query to the source asking for books in respect of which "Aho" is the author.

A limited amount of extension of query functionality is provided for insofar as a notionally unsupported query may be deduced to be logically equivalent to one or more supported queries.

At run time, when a given mediator receives a query request, a Mediator Specification Interpreter aggregates the necessary information from the relevant sources (which might be the wrapper of a native information source or another mediator).

Having regard to the problem of the integration of heterogenous databases therefore, it will be seen that this TSIMMIS mediator solution allows for an expanded query functionality through the construction of new integrating mediators. In this way, respective so-called local views (which is to say the view of a given set of data available with particular query functionality) can be combined to provide ever extensive (local) views. The system so provided in this example cannot however perform any tasks other than the processing of queries to return content.

BRIEF SUMMARY

According to a first aspect of the present invention there is provided a method of resource creation; a system comprising a plurality of sets of one or more resources, each set of resources being associated with a respective representation, the method comprising: receiving the respective representation of each set of resources; transforming the respective representation of each set of resources into a common representation; populating a store with the common representation of each set of resources; permitting the rule-based association of component ones of the resources in their common representation to define a new resource; and creating the new resource from the correspondingly associated respective representations of the component resources.

Advantageously, in this way, through transformation into a common resource representation, a global view of all available system resources (both of an information or data nature and of a service or behaviour nature) is provided from the outset, with such associations then being permitted between component ones of such resources as to allow the specification of complex functionality for new system resources. The creation of these new resources according to the invention therefore provides for a much wider (in terms of the breadth of resources available for integration) and a much more profound (in terms of the ability to define new rule-based functionality) integration then has been available heretofore.

According to a second aspect of the present invention there is provided a method of resource creation; a system comprising a plurality of sets of one or more resources; each set of resources being associated with a respective representation; the respective representation of each set of resources having been transformed into a common representation and a store having been populated with the common representation of each set of resources, the method comprising: permitting the rule-based association of component ones of the resources in their common representation to define a new resource; and creating the new resource.

Likewise advantageously, when provided with a global representation of all available system resources in a common resource representation, such associations are permitted between component ones of such resources as to allow the specification of complex functionality for new system resources. Again, the creation of these new resources according to the invention therefore provides for a much wider (in terms of the breadth of resources available for integration) and a much more profound (in terms of the ability to define new rule-based functionality) integration then has been available heretofore.

Commensurate apparatus is also provided.

BRIEF DESCRIPTION OF THE DRAWINGS

A number of embodiments of the invention will now be described with reference to the accompanying drawings, in which:

FIG. 1 represents a mediator system according to the prior art;

FIG. 2 represents an embodiment of an apparatus according to one aspect of the invention;

DETAILED DESCRIPTION OF EXEMPLARY EMBODIMENTS

FIG. 2 illustrates components in an architecture for implementing an embodiment of an apparatus and method according to one aspect of the invention.

A first, second, third, fourth and fifth computer 200, 202, 204, 206, 208 are connected together by means of a network 210. Suitable general purpose computers are well known; suitable networks including Local Area Networks (LANs) and Wide Area Networks (WANs) are also well known.

Application software executed on each respective computer provides for functionality in respect of network communication and the provision of a middleware environment.

One such typical middleware environment is that provided by CORBA (See, for example, "Instant CORBA", Orfali et al, John Wiley, 1997).

The first computer 200 executes a software application to provide the functionality according to the invention as described herein. This software application program can be loaded onto the first computer by any suitable means. A computer readable medium such as a floppy disk, a CD-ROM or DVD-ROM can be used to store the software application. Alternatively, the software application could be downloaded over a suitable connection, for example a network connection.

The second, third and fourth computers, 202, 204, 206 host resources. For the purposes of this embodiment, the second computer 202 is taken to host a relational database, the third computer 204 an object-oriented database and the fourth computer an extensible Markup Language (XML) database.

Figure 3A:
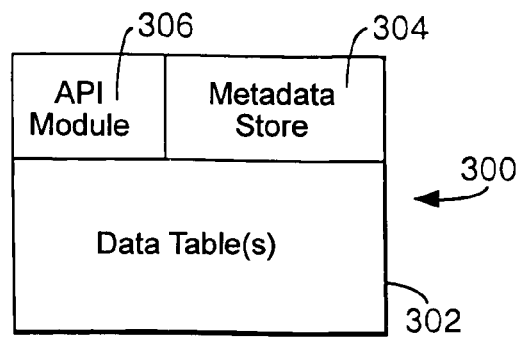
FIGS. 3A to 3D represent schematic illustrations of four resource sources.

FIG. 3A illustrates a schematic representation of the structure of the relational database 300 hosted by the second computer 202. The subject matter data of the database is stored in one or more data tables 302. The database 300 is also provided with a metadata store 304, which provides descriptions of the data tables. Further an API module 306 allows remote interrogation.

Figure 3B:
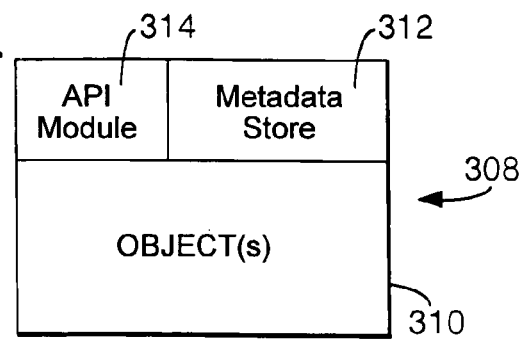

FIG. 3B illustrates a schematic representation of the structure of the object-oriented database 308 hosted by the third computer 204. The subject matter data of the database is stored in one or more objects 310. The database 308 is also provided with a metadata store 312, which provides descriptions of, for example, the object classes and interfaces. Again, an API module 314 allows remote interrogation.

Figure 3C:
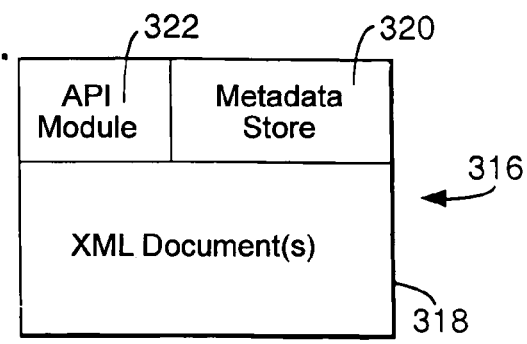

FIG. 3C illustrates a schematic representation of the structure of the XML database 316 hosted by the third computer 206. The subject matter data of the database 316 is stored in one or more XML documents 318. The database 316 is also provided with a metadata store 320, which provides descriptions of, for example, the XML Document Type Definitions (DTDs). Again, an API module 322 allows remote interrogation.

The fourth computer 208 hosts a resource directory service.

Figure 3D:
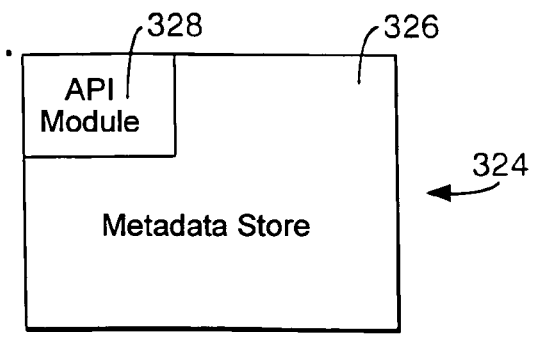

FIG. 3D illustrates a schematic representation of the structure of this resource directory service 324. These resources may take the form of, for example, C functions or objects, and typically will reside on a variety of computers within the network. These resources may however be remotely invoked over the network.

The resource directory has a metadata store 326 in which an interface library is provided. The remote invocation of each such resource is performed through an associated interface. Interface definitions will be provided in respect of C function resources. Class and interface catalogues will be provided in respect of object resources. Again, an API module 328 allows remote interrogation.

In each of the above cases, the middleware environment will provide that, by means of a function call in a client computer API, interfacing with the information source or directory API, a description of the resources publically available throughout the network can be returned to the client computer. Typically these include a schema for each information source, associated information source functionality and functionality distributed throughout the network but published to an interface directory.

When such descriptions are returned to the application, they will identify network resources available in a variety of information or data models. For example, in this case, resources will be identified with relational, object-oriented and XML models. Method functionality will also be identified, through the published interfaces.

Figure 4:
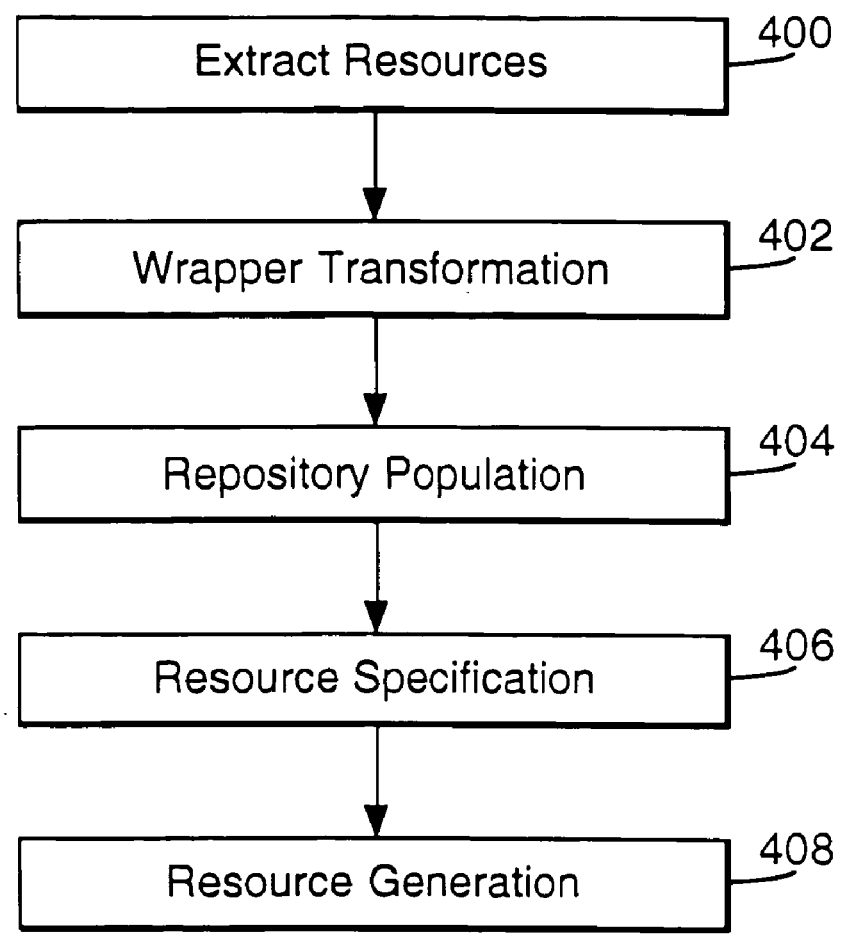
FIG. 4 represents a flowchart of a method according to one aspect of the invention.

Having regard to FIGS. 2 and 4, in a first step 400, interfacing through an API 212, an extractor module 214 performs such an interrogation and thereby receives a description of the available resources.

One or more wrapper modules 216 are provided which effect the transformation between the resource representation in which each respective resource has been identified and a common resource representation. The semantics of one example of a particularly suitable common resource representation, the so-called Model of Object Primitives (MOP) and mappings between MOP and, by way of example, XML, ODMG and the relational data models will be discussed in detail below. A wrapper module 216 mapping into the common resource representation is therefore provided for each of the relational, object-oriented and XML information models. It is to be noted that, for reasons of computational efficiency, pre-stored high-level mappings are preferably created from the publically available specifications of each such model, for example the public specifications of ODMG, XML etc.

In this way, in a second step 402, the one or more wrapper modules 216 perform the transformation of the description of each of the resources identified from their native representations into the common representation.

In a third step 404, each such transformed representation is then stored in a repository store 218. These one or more wrapper modules 216 can also perform the reverse transformation, which is to say that when, for example, a function is called in its common resource representation, the wrapper module can transform this function call back into its native representation, as will be discussed further below.

A further program module 220 provides for a resource specification tool.

Once all these resources have been transformed into the common resource representation and stored in the repository 218, a resource specification module 220 can then cause the contents of the repository to be displayed, as appropriate, to a user of the application. It is to be noted that, of course, whilst the available resources are described in the repository 218, the resources themselves still reside on their native hosts.

One suitable method of display is to utilise a Graphical User Interface (GUI) on a display 222. There will be scope for choice on the part of the tool designer as to how the available resources are depicted. A user may interact, as is typical through a keyboard 224 or mouse 226 or any equivalent device. Two particular examples of an appropriate GUI tool and their associated functionality will be discussed in more detail further below.

In a fifth step 408, in response to the display of the contents of the repository, which is to say the sum total of resources available in a common resource representation, the resource specification tool 220 then permits the user to specify a new resource. This specification is performed through determination of the manner in which component resources are to be associated and in which they will consequently interact. Preferably, the association is carried on the basis of a rule specified linkage of components. The new resource is therefore determined on the basis of a so-called declarative specification rather than dependent on particular issues of implementation.

"Declarative specification of a service, or generally a resource, is the definition of the desired outcome using a set of rules or policies, as opposed to a procedural specification which defines the item by describing the procedure that is to be followed to achieve it. In other words, a declarative specification states what something does without stating how it does it. In a declarative specification, operational details are abstracted out and the definition of resources and services become independent of implementation decisions", Penix J., Alexander P., Havelund K., "Declarative Specification of Software Architectures", Proceedings of 12$^{th}$ International Conference of Automated Software Engineering, Lake Tahoe, Nev. US, November 1997.

By way of example, as discussed in more detail below, when utilising a GUI interface, the specification could be declared in terms of a resource based graph having resources sitting on graph nodes and having their associations specified through edge links.

As soon as the specification of the new resource is complete, the resource specification tool 220 passes the specification to a resource generation module 228. Again as discussed in more detail below, utilising a so-called interpretive mechanism, the resource generation module 228 assembles the new resource. The resource generation module 228 makes reference to the native resource specifications in the repository 218 (to allow location of necessary component network resources, for example, data or objects within data stores and other pre-existing services), and then creates the new resource component (reflecting the now necessary linkages between the component network resources) such as to implement the functionality of the new resource specified with the tool.

In particular, the resource will consist of two parts. A first part is the resource specification where the structure of the resource is defined. A second part is a mechanism for interpreting functionality. This is capable of understanding the structure of the resource as it is defined/pictured in the specification. At runtime, and in case the resource is called upon for use by an application, this mechanism is assigned to implement and execute the specification. By implementation is indicated that the appropriate component resources included in the specification are invoked. By execution is indicated that the mechanism renders the new resource functionally active to perform in the application that uses it as its specification dictates.

The new resource could be assembled directly from the resource specification. Alternatively, in a reverse mapping utilising the wrapper modules 216, the common representation of the new resource could be transformed into the correspondingly associated respective representations of the component resources prior to assembling the new resource.

Preferably, the specification is validated. In particular, when rule-based associations have been made, the logical rules defined by the specification will admit of a consistency validation in terms of inputs and outputs.

These newly created objects can then be stored as appropriate. Preferably these new resources have their interfaces published into the directory service such that they themselves become new system resources.

As indicated above in respect of step 402, a so-called Model of Object Primitives ( MOP or simply primitives) may be utilised advantageously in conjunction with the present invention. In a first section, following a brief introduction, the semantics of the MOP will be discussed. In a second section, three illustrations of the representation of other models (extensible Markup Language (XML), Object Data Management Group (ODMG) and relational models) in terms of the MOP will be provided.

Introduction to Model of Object Primitives

Figure 5:
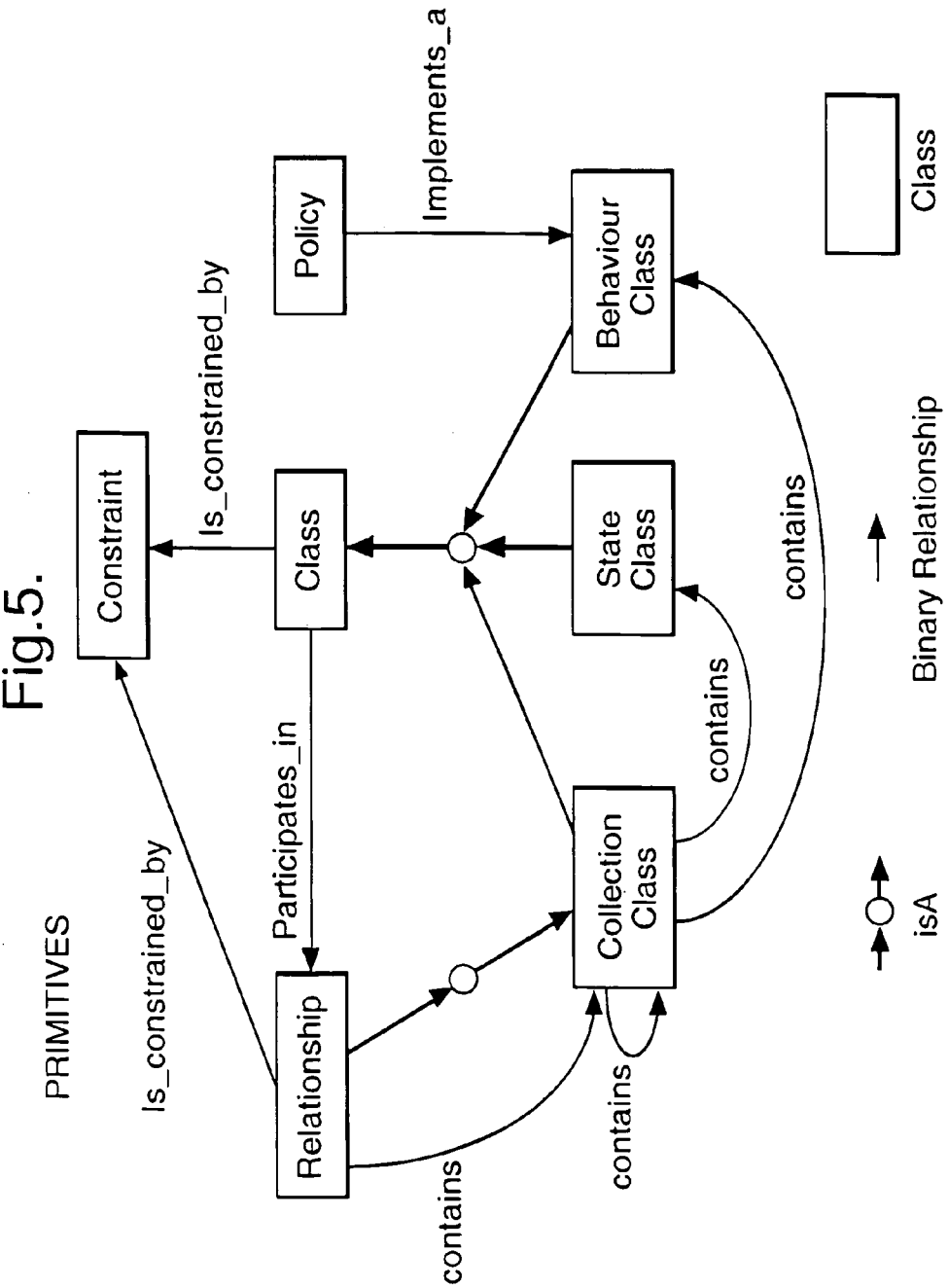
FIG. 5 represents an illustration of the semantic structure of one example of a common resource representation model.

A schematic illustration of the semantics of the Model of Object Primitives is illustrated in FIG. 5.

Object-orientated methods attempt to analyse and model entities relevant to a problem domain as objects of a specific class type. An object has state, which can change in the course of time, and presents certain behaviour. State is reflected in the values of the object attributes and behaviour is determined by the methods the object implements. Additionally, a class is perceived to be the abstraction that describes state and behaviour characteristics for objects of the same type. In other words, a class acts as a template that packages together data variables and methods. Hence inevitably, state and behaviour become concepts that tightly associate their identity with the objects of a certain class.

Objects are analysed in their founding constituents, data and methods i.e. state and behaviour. In MOP, these primitive atoms are each modelled as a separate class. MOPClass is the premium semantics mechanism of MOP. Object primitives are modelled as State Classes and Behaviour Classes (a Behaviour Class will alternatively be referred to as method ), which are special forms of MOPClass. A State Class models the state/data variables encountered in objects and a Behaviour Class models object methods. Another form of MOPClass is Collection Class. This packages together other MOPClasses, e.g. State, Behaviour or even Collection Classes, to construct more complex structures. This point is where MOP meets the classic OO paradigms, since a designer can use Collections to assemble the appropriate data variables and methods and build a construct similar to a class with the traditional sense i.e. a Java or UML class. Relationship is another MOP semantics that indicates an association between two MOPClasses. MOP supports Constraints, which specify certain limitations a designer wants to apply on MOPClasses. For instance, ownership relationships, isA relationships—inheritance—, weak entities can be modelled as plain relationships or classes augmented with a constraint appropriately defined to capture the restrictive properties for each case. Finally, Policies are used as the means to specify behaviour in MOP. They are associated with Behaviour Classes and are intended to describe the way the latter deliver their services.

In the following sections the basic semantics of MOP are examined, namely, MOPClass, State Class, Behaviour Class, Collection Class, Relationship, Constraint and Policy.

MOPClass

A MOPClass is the cornerstone of the MOP semantics. It is never used directly when building a schema in MOP. It constitutes instead the root construct that is extended in order to implement each one of the primary MOP classes described below—state, behaviour, collection, relationship. Hence, it accumulates the features that are commonly encountered among them. Everything in MOP is modelled as a class that is generally of type state, behaviour, collection or relationship. Since the latter types inherit from the root, any class can be considered as an instance of MOPClass.

An instance of MOPClass is characterised by the structure <id, name, description, MOPClass[ ] type>. id is a not nullable and unique integer that distinctively identifies different classes. The name attribute indicates the name of the class. More than one name can be given at definition of a class serving as alternative aliases. Description is a free-text description of what the class represents. This is an optional attribute hence it may be omitted. The type feature specifies the classes that the current one instantiates. The primitives model supports classification, that is a MOPClass can instantiate other, more abstract classes. These abstract classes reside at levels of abstraction higher than their instances. Additionally, MOP supports multiple instantiation i.e. a class can be instance of more than one abstract class; hence, a MOPClass can have more than one types. This is the reason for representing the type feature as an array.

Classification is a property encountered in several semantic models, such as the TELOS knowledge representation language (See, for example, "Telos: Representing Knowledge about Information Systems", Mylopoulos et al, ACM Transactions on Information Systems, Vol 8, No 4, October 1990). It introduces the principle of meta-modelling where someone can build "models that describe models" (See, for example, "Metamodelling in EIA/CDIF- Meta-metamodel and Metamodels", Flatscher, Information Modelling in the New Millenium, Idea Group Publishing 2000). More specifically, classification makes classes be considered as instances of other classes. This feature manifests in MOP through the typing mechanism, which considers that each MOPClass has a type, i.e. it is an instance of other, more abstract classes. This arrangement organises MOPClasses in conceptual/abstract planes, which construct a bottom-up hierarchy. A similarly layered architecture is adopted by the EIF/CDIF standard (See, for example, Flatscher above), which is, however, restrained to only four levels. Classification in MOP is unlimited therefore the number of abstraction layers is also unlimited. The lowest layer M0 is occupied by MOPClasses that can not be further instantiated because they represent concrete values such as integers and Strings (The layer names M0, M1, M2 are chosen to be compatible with the names adopted by the EIF/CDIF standard). Levels M1, M2 and above host instantiable MOPClasses. In order to show that a MOPClass A instantiates a MOPClass B we may use the keyword instanceOf and write A instanceOf B.

Generally, a MOPClass is modelled with one exclusive type of primitive, for instance, State Class or Collection Class. However, a MOPClass might happen to have some instances represented as State Classes and others as Collections. Such case is encountered in Table 2 below which describes the mappings of ODMG semantics unto MOP. In there it is shown that an Attribute can be represented in MOP as a State Class or a Collection. To avoid modelling inconsistencies, it is necessary that the concept Attribute is captured in a way that facilitates its instantiation by State Classes and Collections. This is generally achieved by defining the concept as a MOPClass and declaring in its type feature the primitive types expected to encounter among the concept instances. In the particular example, the Attribute should be defined as MOPClass and the type feature should be set to StateClass and CollectionClass, as shown below.

MOPClass ODMGAttribute {
type: StateClass, CollectionClass }

State Class

A State Class inherits all features of the root MOPClass and it is modelled with an almost similar structure <id, name, description, type, contentType>. The only additional property observed is contentType. This is introduced for usage merely by M1 State Classes. It indicates the type that the M0 instances of a M1 State Class should have. Consequently, the contentType feature can be regarded equivalent to applying a constraint that forces all instances of the current State Class to be simultaneously instances of the contentType-specified MOPClass. However, generally and in the interest of simplicity, it is preferable to use the contentType feature, which implies a constraint, rather than explicitly applying the constraint per se.

An example is shown below, where Name is defined in two equivalent ways: as a State Class with contentType String and as a State Class with a constraint that forces all its instances to be of type String. Both declarations would dictate that State Class Aris, should be a String. Alternatively, this can be achieved if Name does not include the contentType feature and Aris sets its type to Name and String. But, in general, the process of constructing a schema that models a problem domain—this would reside on M1—comes first to the population of the schema with real world entities—these would reside on M0. Hence, for completeness, each M1 class of the schema should include all properties that their M0 instances are expected to satisfy. In the same way, the introduction of contentType in the definition of M1 State Classes aims at specifying in advance the additional type of their M0 instances.

StateClass Name {
  type: ODMGAttribute

StateClass Name{
  type: ODMGAttribute

StateClass Name {
  type: ODMGAttribute

-continued

```
    contentType: String          constrainedBy:  ∀  i  }
}                                instanceOf  this,    i  StateClass Aris {
StateClass Aris {                instanceOf String         type: Name, String
        type: Name          }                           }
}
```

The contentType feature should refer to types that are either State Classes or Collections of State Classes.

MOP is a purely class-based model. Therefore, it does not support any atomic data types (else known as literals) such as int, short, char etc, which are typically used in data definition languages. Instead, these literals are wrapped up in MOPClasses in order for these to become the built-in types of MOP and for MOP to persist its class-based profile. The idea of wrapping literals into classes is also encountered in Java. MOP supports a default set of built-in types that includes Character, String, Integer, Long, Float, Double, Boolean. These types are considered to be State Classes and resemble the set of Java classes that wrap up Java literals. This is because MOP is implemented on Java. The set of MOP built-in types should be enriched if requirements so dictate. For example, this ought to happen when integrating a new model that supports literals not included in or not bound to the MOP literals of the built-in set. These literals should be wrapped up as MOPClasses and comprise part of the built-in MOP types.

Behaviour Class

A behaviour class is a primitive MOPClass that is modelled as a structure of the form <id, name, description, type, MOPClass[ ] argumentTypes, MOPClass[ ] argumentValues, MOPClass resultType, MOPClass[ ] resultValues>. The first features are inherited from the root MOPClass. ArgumentTypes is an array that registers the MOPClasses representing types of input permitted for use by the class. ArgumentValues is an array with MOPClasses that are the input values for the Behaviour Class. These values should comply with the respective types stated in argumentTypes, that is each argumentValue should be an instance of an argumentType. ReturnType designates the MOPClass that represents the type of output of the Behaviour Class. Finally, resultValues is an array of values—MOPClasses—that are of type resultType and are potential outputs of the class.

ResultValues exists only if the Behaviour Class belongs to the predetermined results Behaviour Class category. This category includes Behaviour Classes that return results from a specified and finite set of discrete values a priori determined. For instance, in this category fall methods with resultType Boolean, since their resultValues is [True, False]. In contrast with this, there exists the no predetermined results Behaviour Class category where outcomes of the performed behaviour are not a priori known. This holds mainly because the values that such methods return depend on results reached at runtime. Consequently, the resultValues feature of Behaviour Classes belonging in the latter category is null.

An example is presented next that demonstrates the way a MOP Behaviour Class is defined. The example assumes concepts of an ODMG schema mapped to MOP according to Table 2 below:

```
StateClass name {                BehaviourClass isMale {
    type: ODMGClass                  type: ODMGMethod
    contentType: String              argmumentTypes: name
}                                    resultType: Boolean
                                     resultValues: True, False
                                 }
```

The main contribution of a Behaviour Class is that it separates the implementation and focuses on the description of method properties. This makes a Behaviour Class similar to the concept of an interface, such as a Java interface, which contains signatures of methods and omits their implementations. There is, however, a significant difference. Basically, a MOP Behaviour Class refers directly to one behaviour atom i.e. one method. A Java interface acts as a package of behaviour that may contain more than one method description. Therefore, an interface is literally equivalent to a Collection of Behaviour Classes. This atomic treatment of behaviour in Behaviour Classes combined with the aggregating capability of Collections leverages the construction of optimal interfaces. This is because methods in MOP are recognised building blocks and can be individually referenced in order to construct a new interface. In Java or other languages there is not direct semantics support for method descriptions other than considering them as part of an interface; hence when a new interface is to be constructed it needs to be built entirely from scratch. It is to be noted however that in Java, an interface can extend another interface and hence inherit all existent method descriptions. But even then, if there were a requirement to tailor a new interface i1 with method descriptions that already exist and constitute parts of interfaces i2 i3 and i4, i1 would still include undesired methods, since it has to extend i2 i3 and i4 and hence inherit the surplus methods alongside the useful ones. The only way to avoid that is to model numerous interfaces including only one method and then let i1 extend those that refer to the methods it needs. This is exactly the approach MOP follows with the difference that methods are directly described as Behaviour Classes instead of being included in thin interfaces.

Collection Class

A Collection Class is a MOPClass intended to provide for the concept of aggregation. It can be modelled as a structure that contains other MOPClasses—state, behaviour, collection and relationship. Alternatively, one can view a collection class as an unordered set of classes and relationships that may contain a variant number of members each time a new collection is defined. A collection has the form <id, name, description, type, MOPClass[ ]>. The first features are inherited from the root MOPClass. The MOPClass[ ] array keeps a list of the MOPClasses that are members of the collection.

The keyword memberOf is used at the definition of a MOPClass when it is to be declared as a member of a collection. However, it is preferable and more comprehensible to declare within a Collection the classes it includes. This is done with the keyword members, which is used at the definition of the Collection Class. Here follows an example that presents both alternative ways of member declaration. It is assumed that the concepts belong to an ODMG schema that is mapped to MOP according to Table 2 below:

```
CollectionClass Employee{                CollectionClass Employee{
    type: XMLElementType                     type: XMLElementType
                            or
}                                            members: Name
StateClass Name{                         }
    type: XMLElement                     StateClass Name{
    memberOf: Employee                       type: XMLElement
    contentType: String                      contentType: String
}                                        }
```

In instances of a Collection, each member may be instantiated more than once. This, in fact, shows that each member can have multiple values in one Collection instance.

There are two operators that can be used with a Collection Class. The first is CollectionClass[ ] memberOf (MOPClass ) which applies to any MOPClass and retrieves an array of Collections that the MOPClass belongs to. It is common to use this operator as a keyword in clauses of the form A memberOf B to claim that A belongs to Collection B. The second operator has the reverse effect. It is MOPClass[ ] members (CollectionClass ) and returns an array of MOPClasses that belong to a specific Collection.

A Collection can be defined without a name. This leverages the representation of a group of concepts when it is not necessary to explicitly reference this group by name. The definition of such Collection leaves the name feature null.

Relationship

A Relationship in MOP becomes a first class citizen since it is treated as a MOPClass. This fact contradicts the concept of a relationship, as it is perceived in ODMG.

There, "a relationship is not itself an object an does not have an object identifier. It is defined implicitly by declaration of traversal paths that enable applications to use the logical connections between the objects participating in the relationship" (See, for example, "The Object Database Standard: ODMG 2.0", Cattel et al, Morgan Kauffman Publishers, San Francisco 1998).

A MOP Relationship is captured as a binary association that links two MOPClasses. Therefore, it is a Collection Class in the sense that it aggregates two parties in the association. A MOP Relationship is unidirectional, that is there is an originator and a destination class. The start and end of the Relationship are respectively declared in the from and to section of the Relationship definition. Alternatively, a Relationship can be defined within another class in a similar way. In this case, the hosting class is assumed to be either the originator or the destination of the association, hence the from or to section is respectively omitted from the Relationship definition. Furthermore, a Relationship should, at definition, state its type/s. This implies that Relationships instantiate other more abstract ones. That is a benefit gained from considering a Relationship to be a MOPClass, therefore classification applies to it in the same way it applies to MOPClasses.

The basic features of a MOP Relationship are exhibited in the example below. There we assume that the represented concepts are part of an ODMG schema whose semantics is modelled in MOP according to the mappings shown in Table 2.

```
CollectionClass Employee{            CollectionClass Department{
    type: ODMGClass                      type: ODMGClass
}                              or    }
CollectionClass Department {         CollectionClass Employee{
    type: ODMGClass                      type: ODMGClass
}                                        Relationship works for {
Relationship works for {                     type: ODMGRelationship from
    type: ODMGRelationship from              ODMGClass
    ODMGClass                                to: Department
    from: Employee                       }
    to: Department                   }
}
```

There are two specific operators that apply to a MOP Relationship; MOPClass from (Relationship ) that identifies the originator class of the Relationship and MOPClass to (Relationship ) which returns the destination class.

The semantics of a Relationship are very generic as it can associate different types of MOPClasses. For instance, associated can be amongst them state, behaviour, collection classes and even relationships, since the latter are also MOPClasses in their own right. Additionally, a Relationship is allowed to have its own attributes. This is a feature encountered in many OO models such as the Unified Modelling Language (UML). In MOP this is achieved by aggregating the MOPClasses that represent the attributes within the collection of the Relationship. Then, the Relationship would appear to contain the attribute MOPClasses in addition to the originator and the destination class.

In models, such as the Extended-Entity-Relationship (EER) model, relationships can only be of one of three types determined by their cardinality ratios, namely, one-to-one, one-to-many and many-to-many. A MOP Relationship is different in that it stands alone as a concept. However, a more specialised type of relationship can be constructed, if necessary, by the augmentation of a MOP relationship with a special constraint. This is feasible as MOP relationships are collection classes and therefore constraints can apply on them. Specific examples are studied in the sections that follow.

Constraint

A constraint applies on MOP classes and relationships in order to enforce restrictions on their characteristics or instances. Constraints are related with their restricted parties through the keyword constrainedBy. A class or relationship can establish an association with a constraint either at the time of definition or when included as part of another construct such as a Collection. In the former case the constraint will apply always, wherever and whenever the class occurs. In the latter case, the constraint will only be enforced within the local/special boundaries of the declaration. A useful keyword when expressing a constraint is this, which identifies the class that the constraint applies on. If the constraint applies on a class that is included within another then this refers to the embedded and not the overall class. In other cases, this refers to the MOPClass wherein it is used. Examples of constraints are given in the sections below where MOP semantics are used for the representation of XML and ODMG.

Policy

Policies are traditionally used in the areas of Network Management and Distributed Systems (See, for example, "Policy Service for Distributed Systems", Marriot, PhD thesis, Dept of Computing, Imperial College, London, June 1997). Several policy languages have been developed to address security issues (See, for example, "EPSRC Grant GR/1 96103-SecPol: Specification and Analysis of Security policy for Distributed Systems", Sloman et al, Dept of Computing, Imperial College, London), such as access control, and network issues (See, for example, "Active IETF Working Groups: Policy Framework (Policy)—Charter" at IETF website), such as allocation of network resources and configuration of devices to meet certain QoS criteria. In general, policies have been targeted for low-level (network level) and administrative control applications. What is missing is a dimension where policies can be used to specify high-level behaviour and by this, of course, is meant object behaviour.

A Policy in MOP is tightly coupled with a Behaviour Class. While the latter is intended to specify static characteristics of behaviour, such as name of method and type of method arguments, the former aims at describing the dynamic features of behaviour i.e. the way this behaviour is performed. Practically, a Policy is the service specification for a Behaviour Class; that is, it implements the service the behaviour class is meant to deliver.

Expressing Policies is typically a very challenging issue. This is especially because of the main objective that policies are meant to address, i.e. describing object behaviour. Two ways of modelling are presented here.

First, Policies are considered to be a set of Condition-Action rules. Based on the true or false of a condition, the Policy continues either with executing a sequence of actions or with checking another condition. This representation has been applied in the first example presented below.

Second, a policy is modelled as a set of linked nodes. Each node represents some primitive behaviour i.e. a Behaviour Class. A node has as many outputs as values appear in the resultValues feature of the respective Behaviour Class. The Policy executes one node and then follows onto the next, according to the result. This is a more generic representation than the first and has been applied in the second example presented below.

The convenience of both representations is that they can be visually modelled as graphs. This grants great flexibility in managing Policies and provides grounds for the implementation of user-friendly Policy management tools. The policy representation may be extended further such that it captures events. State Transition Diagrams and events are broadly accepted in OO design paradigms, such as UML, as the means to model object behaviour. Incorporation of events will also provide a strong modelling element to capturing interaction between behaviour components, which is often a common and rather complex situation. This basically refers to a case where some behaviour b1 starts, then stalls, waits for behaviour b2 to perform and then continues again in a direction that is dependent on b2's results; events can work out the communication string between b1 and b2. Some relevant work is presented in, for example, "A Policy Description Language", Lobo et al, Proceedings of AAAl99 Conference, Orlando, Fla., July 1999, where an event-based Policy description language is proposed.

A Behaviour Class becomes related to a MOP Policy with the keyword implementedBy. A policy can be related to—implement—more than one Behaviour Class and, conversely, a Behaviour Class can be related to—be implemented by—many policies. This corresponds to a Java feature where classes can implement more than one interface and interfaces can be implemented by more than one class.

Policies do not get instantiated; only Behaviour Classes do. This is so because the role of a Behaviour Class is to represent a piece of behaviour as a concrete entity. Therefore, it is sensible that only them are instantiable. On the other hand, Policies simply describe a service specification, which should be delivered by the associated method. A Policy is not a MOPClass and as such it cannot have instances.

Information Model Representation Case Studies

In this section the generality and flexibility of MOP is studied in representing different data-models, XML and OO in particular. It is intended to demonstrate that MOP can be placed at the last abstraction layer of the above mentioned model—M4—i.e., above the layer of data-model descriptions, and hence provide the leverage for the generic representation of a variety of information models with data and behaviour characteristics.

XML in Object Primitives

Figure 6:
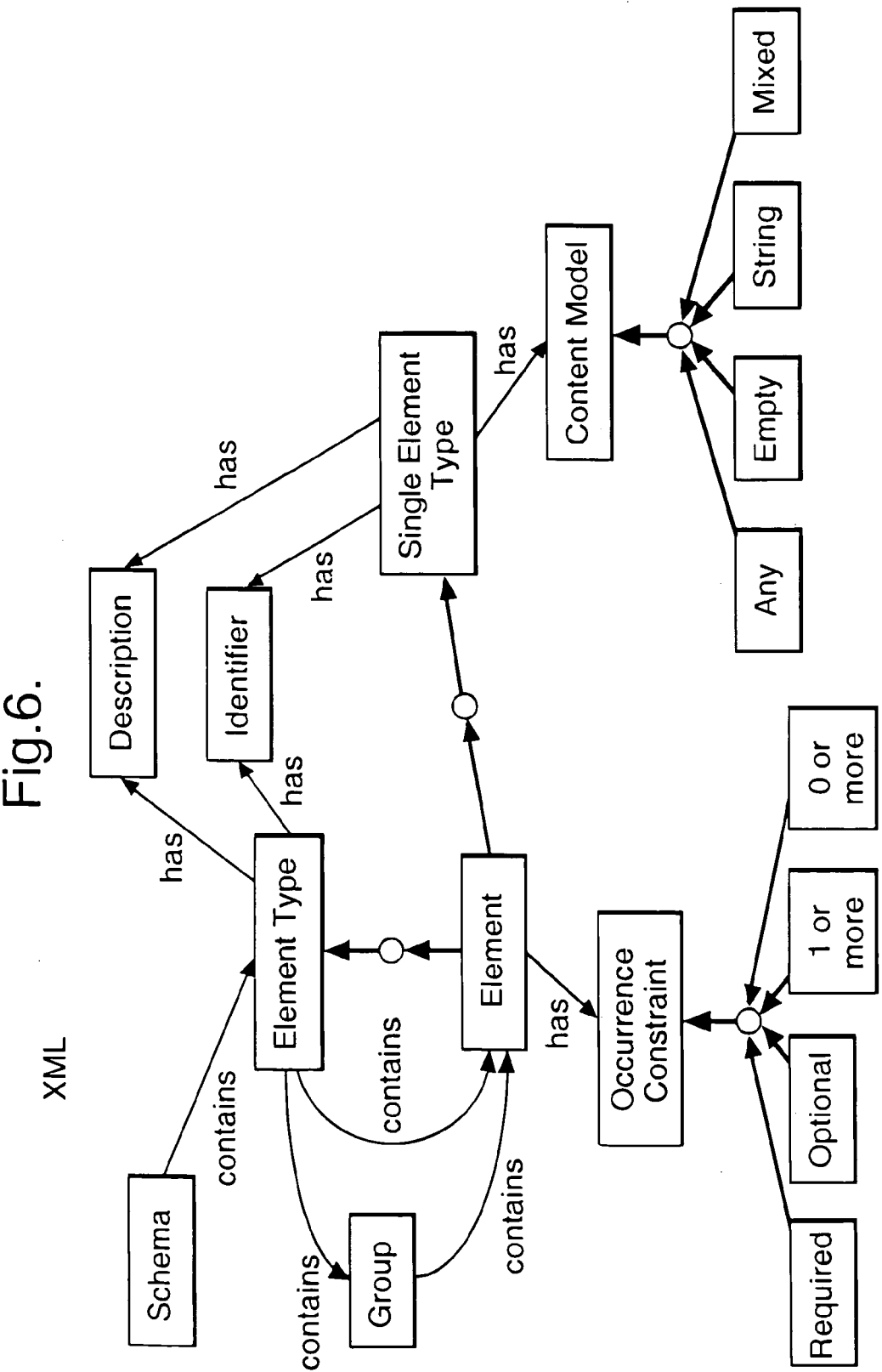
FIG. 6 represents an illustration of the semantic structure of the eXtensible Markup Language (XML) information model.

XML is illustrated in FIG. 6 as a meta-model of the basic semantics it uses.

The construction of this meta-model is based on the specification of XML given in "XML Data", World Wide Web Consortium (W3C) website, January 1998. The structure of the information contained in a XML document is declared by a schema. The schema includes several sorts of element types. Single or atomic element types carry an identifier and optionally a description. However, more complex element types may exist that consist of properties/elements. These types will be referred to as composite element types. Elements are also defined as element types that in turn can be either single or composite. Each element within an element type specifies whether it is optional or required and if it occurs in the type 0,1, or many times. The structure of an element type is called content model. Specifically for single element types the content model determines whether the element type is Empty, a String, a mixture of characters and content of declared element types or a mixture of contents from any element type contained in the schema but no free characters. A group indicates a set or sequence of elements within a composite element type and it is treated similarly to an element. Element types can be organised into class hierarchies with subtypes and supertypes where an instance of the subtype is also an instance of the supertype. When the supertype is declared as genus of the subtype, then the latter additionally inherits the supertype's elements.

TABLE 1

XML to MOP mappings

| XML semantics | MOP representation |
|---|---|
| Schema Element Type | Collection Class |
| Single Element Type | State Class |
| Identifier | Name |

TABLE 1-continued

XML to MOP mappings

| XML semantics | MOP representation |
|---|---|
| Description | Description |
| Content (Empty, Any, String, Mixed) | ContentType |
| Composite Element Type: | Collection Class |
| Single Element Type + (Required, Optional, OneOrMore, ZeroOrMore) | State Class + occurrenceConstraint |
| Composite Element Type + (Required, Optional, OneOrMore, ZeroOrMore) | Collection Class (of Composite Element Type template) + occurrenceConstraint |
| Group | Collection Class with no name |
| Supertype | Relationship + subsetConstraint |
| Genus | Relationship + subsetConstraint + inheritanceConstraint |

Table 1 illustrates the mapping of XML semantics on MOP. More analytically, the table shows that:
  a schema in XML maps to a Collection Class.
    CollectionClass XMLSchema {
      members: XMLElementType
    }
  This is because a schema contains element types in the same sense a Collection Class includes MOPClasses.
  an element type is modelled as State Class if it is single and as Collection Class if it is composite.
    MOPClass XMLElementType{
      type: CollectionClass, StateClass
    }
  An element type's identifier and description correspond to MOPClass name and description. For a single element type the content model corresponds to the contentType feature of the State Class. The string content model is equivalent to declaring a String contenttype. Any is equivalent to a contentType that declares a Collection of State Classes. The Collection is constrained to contain State Classes of type XMLElementType that belong to the same XMLSchema as the single Element Type. A mixed content model similarly indicates a contentType of Collection Class. The Collection contains String or State Classes of type XMLElementType.
  For composite element types the respective MOP Collection contains State Classes which represent single element type elements or other Collections which model composite element type elements. In analogy to the required occurrence value, a MOP constraint is applied on the respective Collection member that forces it to be not nullable for all instances of the Collection. Without this constraint, members can be null in some cases and this corresponds to the optional occurrence value. OneOrMore and ZeroOrMore values are covered by the property of the Collection members to acquire multiple values within a Collection instance.
    a group is modelled as a Collection Class without a name.
    subset relationships and inheritance, declared respectively by the superType and genus XML attributes, are modelled as MOP Relationships augmented with Subset and Inheritance constraints. The former ensures that instances of an MOPClass of type XMLElementType, which is the start for a Relationship of type SubsetOf, should be instances of the MOPClass, which ends the Relationship. The latter forces members of a MOPClass, which is of type XMLElementType and ends a Relationship of type InheritsOf, to be members of the MOPClass that starts this Relationship.

| Relationship SubsetOf{ | Relationship InheritsFrom{ |
|---|---|
|   from: XMLElementType |   from: XMLElementType |
|   to: XMLElementType |   to: XMLElementType |
|   constrainedBy: Subset |   constrainedBy: Subset, Inheritance |
| } | } |

Constraint Subset: ($\forall$i instanceOf this, k instanceOf from(i)=> k instanceOf to(i) )
Constraint Inheritance: ($\forall$i instanceOf this, m memberOf to(i) => m memberOf from(i) )

A full example of an XML schema represented in MOP is given below.

| XML | MOP |
|---|---|
| <s:schema id = 'ExampleSchema'> | CollectionClass ExampleSchema { |
|   <elementType id = "Name"> |   Type: XMLSchema |
|     <description> The name of some person </description> |   Members: Name, Person, Author, Title, Preface, Introduction, Book, |
|     <string/> |   Price, ThingsRecentlyBought, |
|   </elementType> |   BooksRecentlyBought |
|  | } |
|   <elementType id = "Person"> | StateClass Name { |
|     <any/> |   Type: XMLElementType |
|   </elementType> |   contentType: String |
|  | } |
|   <elementType id = "Author"> | StateClass Person { |
|     <mixed> <element type = "Name"> </mixed> |   type: XMLElementType |
|   </elementType> |   contentType: CollectionClass constrainedBy Any |
|  | } |
|   <elementType id = "Title"> | StateClass Author { |

-continued

| XML | MOP |
|---|---|
| <string/><br></elementType><br><br><elementType id = "Introduction"><br>  <string/><br></elementType><br><br><elementType id = "Preface"><br>  <string/><br></elementType><br><br><elementType id = "Book"><br>  <element type="#Title" occurs = "REQUIRED"/><br>  <element type = "#Author" occurs = "ONEORMORE"/><br>  <group occurs = "REQUIRED"><br>    <element type = "#Preface"/><br>    <element type = "#Introduction"/><br>  </group><br></elementType><br><br><elementType id = "Price"><br>  <string/><br></elementType><br><br><elementType id = "ThingsRecentlyBought"><br>  <element type= "#Price"/><br></elementType><br><br><elementType id = "BooksRecentlyBought"><br>  <genus type = "#Book"><br>  <superType type = "#ThingsRecentlyBought"/><br>  <element type = "#Price"/><br></elementType><br></s:schema> | type: XMLElementType<br>contentType:<br>  CollectionClass {<br>    members: String, Name<br>  }<br>}<br>StateClass Title{<br>  type: XMLElementType<br>  contentType: String<br>}<br>StateClass Introduction{<br>  type: XMLElementType<br>  contentType: String<br>}<br>StateClass Preface{<br>  type: XMLElementType<br>  contentType: String<br>}<br>CollectionClass Book {<br>  type: XMLElementType<br>  members: Title constrainedBy Required, Author,<br>    CollectionClass {<br>      members: Preface, Introduction<br>    } constrainedBy Required<br>}<br>StateClass Price {<br>  type: XMLElementType<br>  contentType: String<br>}<br>CollectionClass ThingsRecentlyBought{<br>  type: XMLElementType<br>  members: Price<br>}<br>CollectionClass BooksRecentlyBought{<br>  type: XMLElementType<br>  members: Price<br>  Relationship inheritsBook {<br>    type: InheritsFrom<br>    to: Book<br>  }<br>  Relationship subsetsThings {<br>    type: SubsetOf<br>    to: ThingsRecentlyBought<br>  }<br>} |

Constraint Any: ($\forall$i instanceOf this, m memberOf i $\Rightarrow$ m memberOf ExampleSchema)

Constraint Required: ($\forall$i instance of this, $\neg$ (i=null) )

ODMG in Object Primitives

Figure 7:
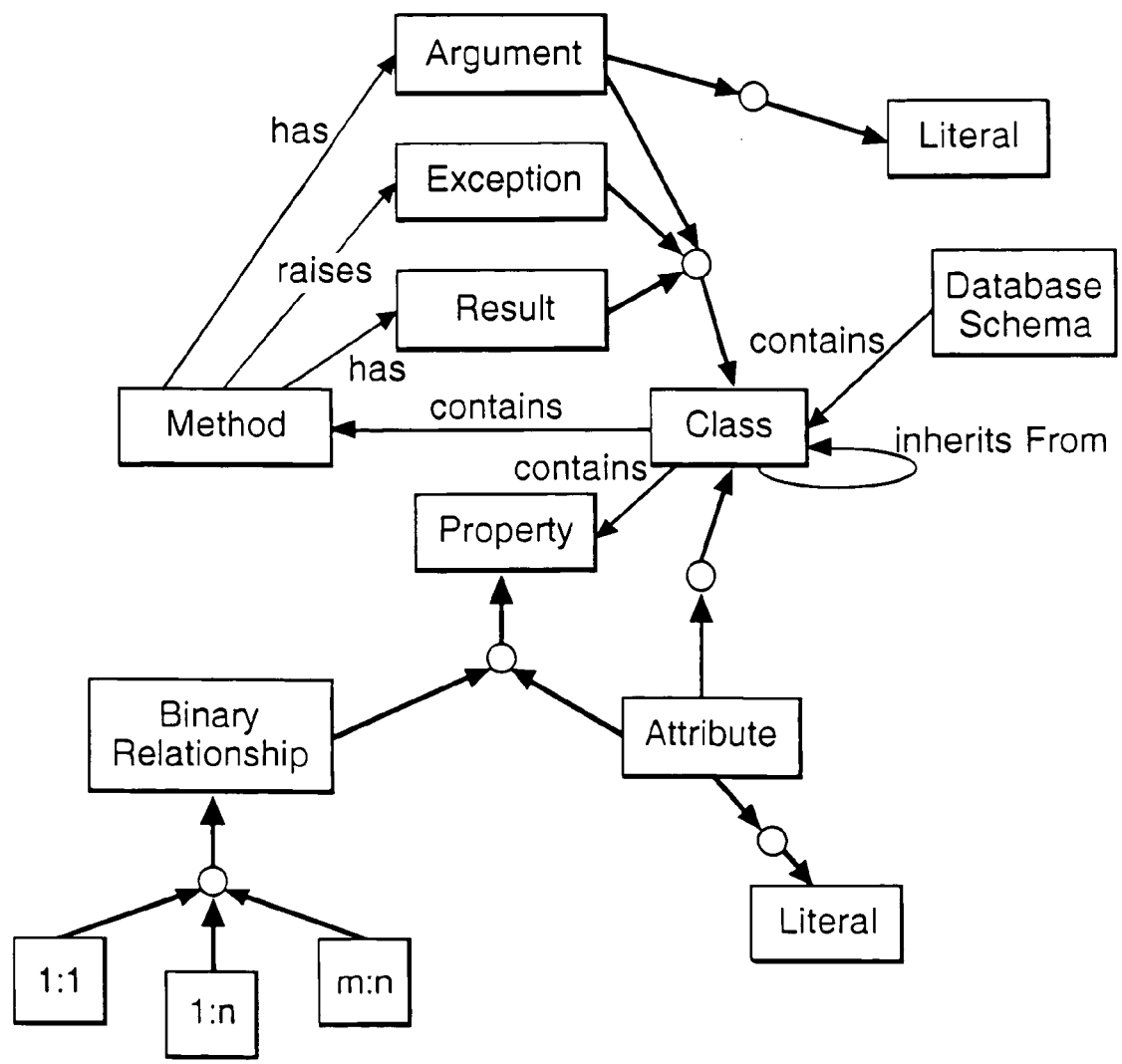
FIG. 7 represents an illustration of the semantic structure of the Object Data Management Group (ODMG) information model.

ODMG is illustrated in FIG. 7 as a meta-model of its basic semantics.

The construction of the meta-model is based on the ODMG specification presented in "The Object Database Standard: ODMG 2.0", Cattel et al, Morgan Kauffman Publishers, San Francisco 1998. The ODMG semantics are similar to any OO language and therefore no further detailed description is provided.

TABLE 2

ODMG to MOP mappings

| ODMG semantics | MOP representation |
|---|---|
| Database Schema | Collection Class |
| Class | Collection Class |
|   Attribute | State or Collection Class |
|   Relationship | Relationship |
|   Method | Behaviour class + Policy |

TABLE 2-continued

ODMG to MOP mappings

| ODMG semantics | MOP representation |
|---|---|
| Attribute | State or Collection Class |
| Relationship (1:1, 1:n, m:n) | Relationship + cardinalityConstraint |
| Method | Behaviour Class |
| Inheritance | Relationship + InheritanceConstraint |

Table 2 presents the mappings between ODMG and MOP. More analytically:

a database schema is modelled as a Collection Class.
  CollectionClass ODMGSchema{
    members: ODMGClass
  }
  Every instance of ODMGSchema should include MOPClasses that represent ODMG classes of a database schema.

a class in ODMG contains attributes, relationships and methods hence it is modelled as a Collection Class.
  CollectionClass ODMG Class { members: ODMGAttribute, ODMGMethod, ODMGRelationship
}
an attribute can have as type either a literal, such as string or float, or another class of the same schema. In the former case it is modelled as State Class and in the latter as a Collection.
MOPClass ODMGAttribute{
   type: CollectionClass, StateClass
}
[ODMG 1998] presents the ODMG- Java binding and it shows how ODMG literals map to Java classes that wrap up the Java literals. This mapping similarly applies on ODMG and MOP literals, since the set of MOP built-in types resembles the set of Java wrapped literals, as mentioned in Section . . . .
StateClass ODMGLiteral{
   type: String, Character, Integer, Long, Float, Double, Boolean
}
a method is represented as a Behaviour Class. The types of its arguments and results are ODMGClass or ODMGLiteral. A method in ODMG raises an exception when an error occurs. An exception is modelled as a Behaviour Class, which is related to ODMGMethod with the ODMGRaises Relationship.

originator for the MOP Relationship. The cardinality ratios of 1:1, 1:n and m:n are interpreted as cardinality constraints imposed on ODMGRelationship. Below we express the OnetoOne and OnetoMany constraints assuming for the latter that the originator ODMGClass instance is the one sitting at the Many-end of the relationship. ODMGRelationship free of constraints represents the m:n case.

| Relationship | Relationship | Relationship |
|---|---|---|
| ODMGRelationship{<br>  from: ODMGClass<br>  to: ODMGClass<br>} | ODMGRelationship{<br>  from: ODMGClass<br>  to: ODMGClass<br>  constrainedBy:<br>    OneToMany<br>} | ODMGRelationship{<br>  from: ODMGClass<br>  to: ODMGClass<br>  constrainedBy:<br>    OneToOne<br>} |

Constraint OnetoOne: ($\forall$i instanceOf this,$\forall$k1,k2 instanceOf i, $\neg$ (k1=k2)$\Rightarrow$ $\neg$ (from(k1)=from(k2)) AND $\neg$ (to (k1)=to(k2))

Constraint OnetoMany: ($\forall$i instanceOf this,$\forall$k1,k2 instanceOf i, $\neg$ (k1=k2)$\Rightarrow$ $\neg$ (to(k1)=to(k2))

inheritance in ODMG is represented as a MOP Relationship augmented with the inheritance constraint. Inher-

```
BehaviourClass ODMGMethod {            BehaviourClass ODMGException{ }
    argumentTypes:    ODMGClass,       Relationship ODMGRaises {
    ODMGLiteral                            from: ODMGMethod
         returnType:  ODMGClass,           to: ODMGException
    ODMGLiteral                        }
}
``` a relationship is directly mapped to a MOP Relationship. An arising issue is that a MOP Relationship is uni-directional whereas a ODMG relationship is bi-directional. It is at the designer's disposition to choose one of the two ODMGClass instances involved as the itsFrom is modelled exactly as in XML examined in the previous section.

an example follows that illustrates the ODMG-to-MOP mappings in more detail

ODMG

```
class Salary{                          class Employee{                    class Professor extends
    attribute float base;                  attribute string name;         Employee{
    attribute float overtime;              attribute short id;                attribute string rank;
    attribute float bonus;                 attribute Salary salary;           relationship
}                                          void hire( );                      set<Section> teaches
class Section {                            void   fire( )     raises         inverse    Section::
    attribute string number;           (no_such_employee);                    is_taught_by;
    relationship  Professor            }                                  }
    is_taught_by    inverse
    Professor::teaches;
}
```

MOP

```
StateClass Base{                       StateClass Name{                   Relationship teaches{
    type: ODMGAttribute                    type: ODMGAttribute                type:
    contentType: Float                     contentType: String                ODMGRelationship
}                                      }                                      constrainedBy
StateClass Overtime{                   BehaviourClass Hire {                  OneToMany
    type: ODMGAttribute                    type: ODMGMethod                   from: Professor
    contentType: Float                 }                                      to: Section
}                                      BehaviourClass Fire{               }
StateClass Bonus{                          type: ODMGMethod
    type: ODMGAttribute                    Relationship                   StateClass Rank{
    contentType: Float                     raisesException {                  type: ODMGAttribute
}                                              type: ODMGRaises               contentType: String
Collection Salary {                            to:                        }
                                                                          CollectionClass Professor
```

```
-continued type: ODMGClass           No_Such_Employee    {
members:     Base,        }                   type: ODMGClass
Overtime, Bonus           }                   members: Rank
}                         CollectionClass     Relationship
                          Employee{           inheritsPerson{
                            type: ODMGClass     type: inheritsFrom
                            members:  Name,     to: Person
                            Salary, Hire, Fire  }
                          }                   }
```

Relational Model in Object Primitives

Figure 8:
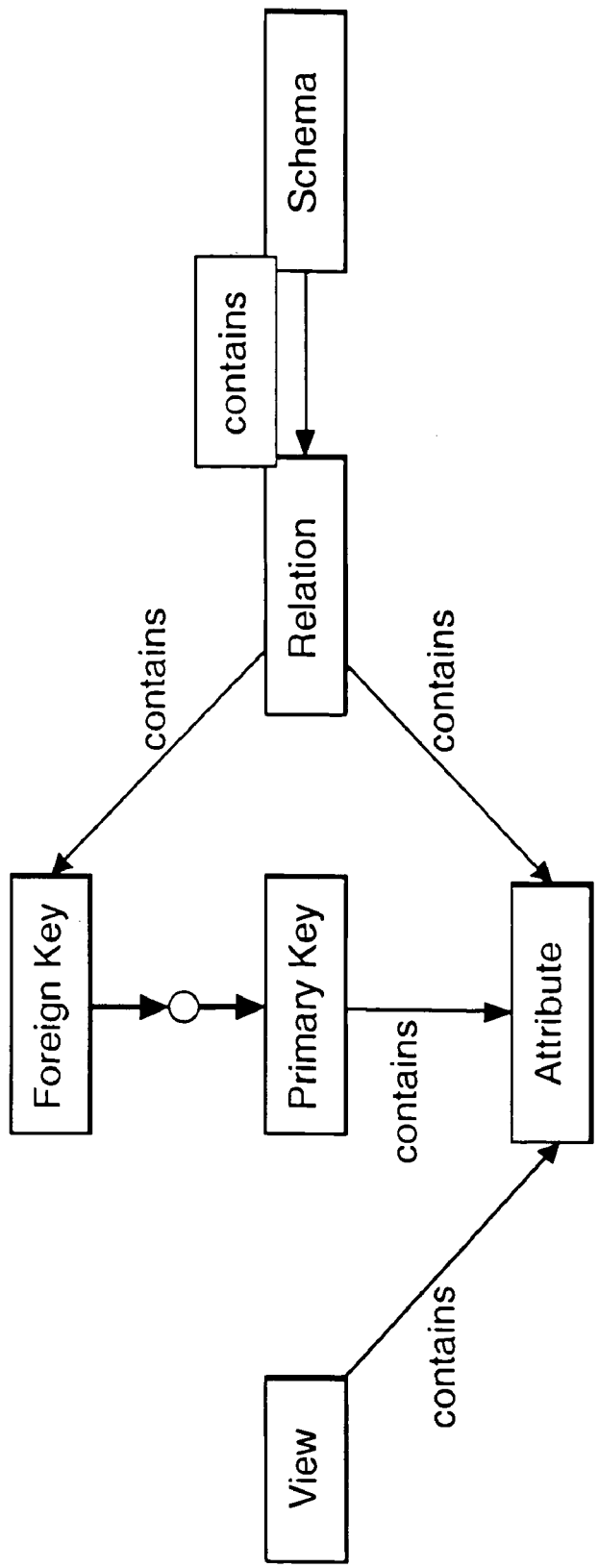
FIG. 8 represents an illustration of the semantic structure of the Relational Data Model.

The Relational data-model was introduced in a "Relational Model of Data for Large Shared Data Banks", Codd, Communication of the ACM, Vol 13, No 6, pp 377–387, 1970. The semantics of the Relational data model are illustrated in FIG. 8.

TABLE 3

Relational to MOP mappings

| Relational constructs | MOP representation |
|---|---|
| Schema | Collection Class |
| Relation | Collection Class |
| Primary Key | Collection |
| Attribute | State Class |
| Foreign Key | Collection |
| Attribute | State Class |
| Primary Key | Collection Class |
| Foreign Key | Collection Class |
| View | Collection Class |
| Attribute | State Class |

Table 3 presents the mappings between the Relational data-model and MOP. More analytically:

a schema is a Collection Class.
  CollectionClass SQLSchema {
    members: SQLRelation
  }
  An instance of SQLSchema aggregates MOPClasses that represent relations.

a relation contains attributes therefore it is modelled as a Collection Class
  CollectionClass SQLRelation{
    members: SQLKey, SQLAttribute
  } an attribute in the relational model can be of literal type, such as integer or string, hence it is represented as a State Class. Again, as in the case of the ODMG-MOP mappings, the relational literal types get mapped to the built-in MOP literals
  StateClass SQLAttribute {
  } a key is a set of one or more attributes. Hence, it is mapped to a Collection Class. A key aims at uniquely identifying each tuple in a relation. In other words, a key instance identifies one tuple and one tuple is identified by only one key instance. Therefore, we introduce the Identifies MOP Relationship that engages the SQLPrimaryKey and SQLRelation Collections into a 1:1 association. The 1:1 property of Identifies is represented by the OneToOne constraint, which is defined in the previous section.

```
CollectionClass SQLPrimaryKey{     Relationship Identifies{
  members: SQLAttribute              from: SQLPrimaryKey
}                                    to: SQLRelation
                                     constrainedBy: OneToOne
                                   }
``` a foreign key is a set of attributes that comprises the key of another relation. Hence, it is represented with the same Collection Class that models the respective key and it is contained in the SQLRelation that models the relation of which the foreign key is part.

a view is composed of attributes that stem from different relations. It is modelled as a Collection Class with SQLAttribute members.
  CollectionClass SQLView {
    members: SQLAttribute
  }
  An example is given in order to depict the representation of a Relational schema in MOP. The underlined attributes correspond to the key and the italicised ones to the foreign key.

Relational

Employee (EmpID, Name)

Department(SectionNo, DepartmentNo, EmpID)

```
MOP

StateClass EmpID{                  StateClass SectionNo {
  type: SQLAttribute                 type: SQLAttribute
  contentType: Integer               contentType: Integer
}                                  }
StateClass Name{                   StateClass DepartmentNo{
  type: SQLAttribute                 type: SQLAttribute
  contentType: String                contentType: Integer
}                                  }
CollectionClass EmployeeKey{       CollectionClass DeptKey{
```

```
    type: SQLPrimaryKey                           type: SQLPrimaryKey
    members: EmpID                                members: SectionNo, DepartmentNo
}                                             }
CollectionClass Employee {                    CollectionClass Department{
    type: SQLRelation                             type: SQLRelation
    members: Name, EmployeeKey                    members: DeptKey, EmployeeKey
    Relationship idenitifiesRelation {        }
        type:   Identifies          from
        SQLPrimaryKey
        from: EmployeeKey
    }
}
```

Examples of Graphical Resource Creation Tools

As discussed above, a set of heterogeneous data-sources (XML, OO or relational) and a network of software components that communicate in order to deliver a service to end-users are presented. Both put together synthesise a context. Within the boundaries of this context, the architecture aims at offering the capability to conglomerate resources, i.e., component behaviour and entities stored in database schemata, under particular conditions in order to provide a user service of customised or more sophisticated behaviour. In this setting, the common information model, for example, MOP becomes the means for representing and managing of all the publishable and available to use context resources. This is so as a result of the powerful mechanisms MOP supports and which facilitate primitive representation of resources, processing of primitives for the construction of complex aggregations and the specification of new behaviour through policies. The architecture consists of a suite of tools that includes:

Front-end graphical tools for service specification. As discussed above, such tools facilitate the declarative definition of a service. Service specification is a description of the way a service should behave. The specification is, for example, delivered in the form of a MOP policy. These front-end tools are used to construct a policy. It is intended that the policy should either customise the behaviour of an existent service or construct a new service by establishing rational associations between context resources. It is to be noted that the term "rational" asserts that a policy, when viewed as a simple set of rules, utilises operations and entities of the context to build rule conditions and sequences of action. Based on the value—true or false—of a condition a particular flow of action is followed. Therefore, the rules can be considered as logical—rational—relationships established among the context resources Service generator, which based on a specification generates a component that delivers the new service. When the specification aims at customising the behaviour of an existent service, this tool associates the new customising policy with the component that delivers the service.

Particular notice is given to MOPper, a prototype tool implemented in Java that is mainly used to construct graph-based MOP policies, i.e. service specifications.

A first example of such a method and tool assumes an environment—context—of services and assets—context resources—that customers are subscribed to and obtain access by means of user-profiles. Examples of subscribed services may be directory or banking services and relevant assets can be agenda, accounts etc. The main objective here is to provide the capability at the customer's end to customise a service's behaviour using parameters or functionality stemming from the same or other services he/she is subscribed to. The MOP-based architecture complies satisfactorily with the requirements imposed by the problem. More specifically, the context resources are wrapped up and converted into MOP classes. Hence, parameters and service functionality become MOP state and behaviour classes. They, then, populate a repository. The customer aims at using these resources to construct MOP policies, which, when associated with a service, they manage to customise the service's behaviour. MOPper has been constructed to serve this purpose. A policy in MOPper is visually modelled as a Direct Acyclic Graph (DAG). The nodes of the graph represent conditions or actions. The edges specify the transition to subsequent conditions/actions. The repository content can be viewed through popup menus and is used to edit the node labels. The types of edges are TRUE, FALSE or unlabelled. The first two define the transition in case of a true or false condition and the last shows transition from one action to another. After a MOP policy is graphically constructed it is then validated in terms of graph correctness and consistent use of the context resources e.g. if the argument values used in a MOP behaviour class are of the correct type. Subsequently, it gets translated into a set of Java objects that logically represent the policy and its nodes. Finally, the service generator component associates the policy the service to be customised and the policy gets saved for future use.

Figure 9:
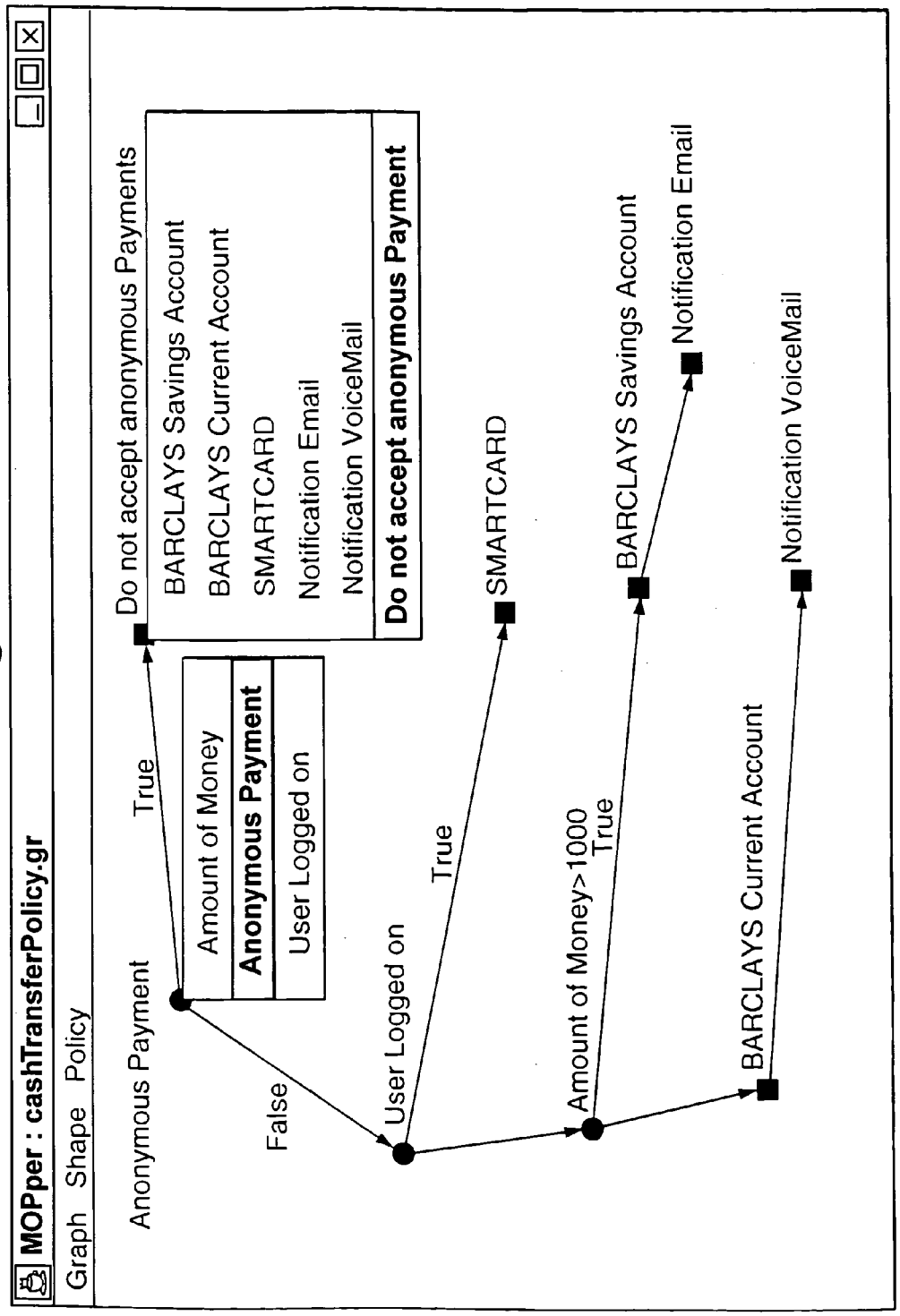
FIG. 9 represents a display illustrating the use of a first example of an apparatus according with one aspect of the invention.

FIG. 9 illustrates MOPper and a policy that customises the behaviour of a cash transfer service. That is, a payer desires to transfer cash to a payee but it is the payee's policy that determines to what asset the money will be transferred e.g. deposit/current account or smart card. The repository content is shown in popup menus, where the context resources appear to be referred to with the content of the MOPClass description feature. For purposes particular only to this case, the context resources appear separated in two popup menus, one specific for editing condition nodes and the other for editing action nodes. This has been achieved by grouping in two separate Collection Classes condition-specific and action-specific context resources.

A second example of such a method and tool assumes a telephony environment where callers and callees interact by means of agents. An agent follows a policy and negotiates with other agents in order to handle incoming phone calls. Again here, there are wrappers that convert the environment's operations in MOP behaviour classes and a repository that keeps references to these. In order to demonstrate the aggregating capability of MOP, the wrapped up operations are managed in groups, i.e., MOP Collection Classes. MOPper is used again to compose policies. This time policies are captured in a more generic form. The nodes in the policy graph represent behaviour classes with several alternative outputs. Thus, instead of having conditional nodes with either TRUE or FALSE edges as outputs, there are operational nodes and outgoing edges with values stemming from the set of the permitted operation results. The operations represented in the repository are viewed in popup menus, which hierachise operations based on the Collections they belong to. For each edge there is a popup menu dynamically created that visualises the permitted outcomes for the originator node.

Figure 10:
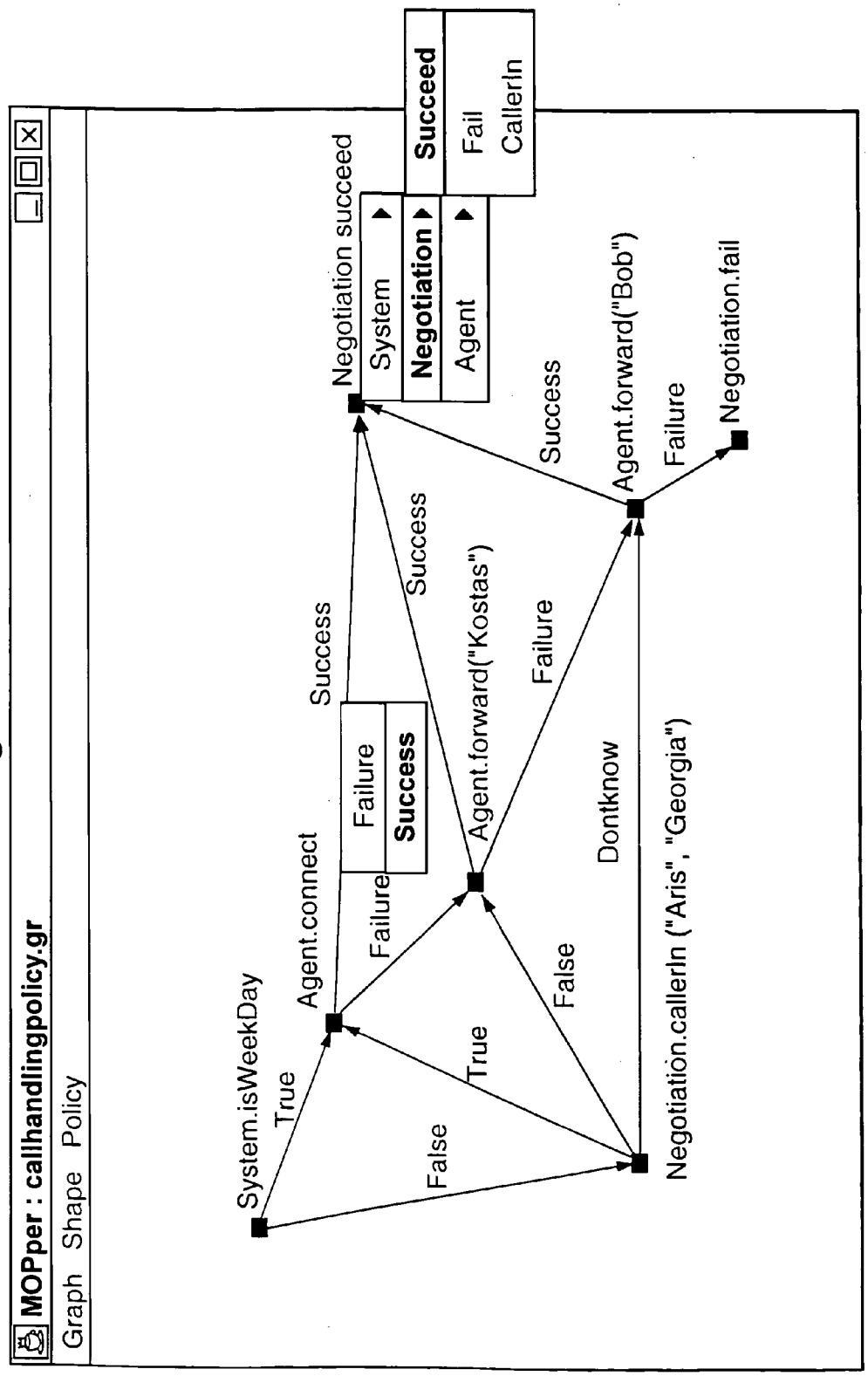
FIG. 10 represents a display illustrating the use of a second example of an apparatus according with one aspect of the invention.

FIG. 10 depicts MOPper and a call handling policy of an agent. After the graph is constructed, it gets validated and translated into a logical set of objects, as described in the previous case. Finally, the service generator creates a component that consists of the policy and an executing mechanism for it. This component constitutes a fundamental part of the agent that primarily determines the agent behaviour over a negotiation.

What is claimed is:

1. A method of resource creation using a system comprising a plurality of sets of one or more resources, each set of resources being associated with a respective representation, the method comprising:

receiving the respective representation of each set of resources;

transforming the respective representation of each set of resources into a common representation;

populating a store with the common representation of each set of resources;

permitting the rule-based association of component ones of the resources in their common representation to define a new resource; and creating the new resource from the correspondingly associated respective representations of the component resources.

2. A method as claimed in claim 1 further comprising utilizing prestored mappings in transforming between the respective representation of each resource and a common resource representation.

3. A method as claimed in claim 1 further comprising representing each common resource with a chosen combination of semantic elements, wherein the permissible set of semantic elements from which to choose comprises:

a state class representing an element of state;

a behaviour class representing an element of behaviour;

a collection class representing an aggregation of one or more classes;

a relationship class representing an association between two or more classes; and a constraint representing a logical expression associated with one or more classes.

4. A method as claimed in claim 1 further comprising providing a user interface tool to facilitate the step of permitting the rule-based association of component ones of the resources in their common representation to define a new resource.

5. A method as claimed in claim 4 further comprising arranging the user interface tool to utilize a graphic representation of a direct acyclic graph.

6. A method as claimed in claim 1 further comprising validating the association of the component resources.

7. A method as claimed in claim 1 further comprising publishing the newly created resource as a new system resource.

8. A computer program storage medium, the medium embodying computer readable code for reading into a computer and executable by the computer to perform the method according to claim 1.

9. An apparatus for resource creation using a system comprising a plurality of sets of one or more resources, each set of resources being associated with a respective representation, the apparatus comprising:

means arranged to receive the respective representation of each set of resources;

means arranged to transform the respective representation of each set of resources into a common representation;

means arranged to populate a store with the common representation of each set of resources;

means arranged to permit a rule-based association of component ones of the resources in their common representation to define a new resource; and means arranged to create the new resource from the correspondingly associated respective representations of the component resources.

10. An apparatus as claimed in claim 9 wherein the means arranged to transform the respective representation of each set of resources into a common representation comprises means arranged to represent each common resource with a chosen combination of semantic elements, wherein the permissible set of semantic elements from which to choose comprises:

a state class representing an element of state;

a behaviour class representing an element of behaviour;

a collection class representing an aggregation of one or more classes;

a relationship class representing an association between two or more classes; and a constraint representing a logical expression associated with one or more classes.

* * * * *